United States Patent
Hamoir

(10) Patent No.: US 7,593,640 B2
(45) Date of Patent: Sep. 22, 2009

(54) METHOD OF DYNAMICALLY CONTROLLING AN OPTICAL MODULE

(75) Inventor: Dominique Hamoir, Nozay (FR)

(73) Assignee: Alcatel Optronics France, Paris (FR)

( * ) Notice: Subject to any disclaimer, the term of this patent is extended or adjusted under 35 U.S.C. 154(b) by 631 days.

(21) Appl. No.: 10/294,701

(22) Filed: Nov. 15, 2002

(65) Prior Publication Data

US 2003/0151789 A1 Aug. 14, 2003

(30) Foreign Application Priority Data

Nov. 15, 2001 (FR) ................... 01 14791

(51) Int. Cl.
H04B 10/00 (2006.01)
G06F 11/00 (2006.01)
H04B 10/08 (2006.01)

(52) U.S. Cl. .................. 398/97; 398/177; 398/175; 398/173; 398/181

(58) Field of Classification Search ............ 398/25–38, 398/93, 137, 123, 11, 18, 202, 23, 24, 177, 398/175, 173, 181, 97
See application file for complete search history.

(56) References Cited

U.S. PATENT DOCUMENTS

| | | | | |
|---|---|---|---|---|
| 5,060,310 A * | 10/1991 | Frisch et al. ................ | 398/193 |
| 5,315,674 A * | 5/1994 | Asako ........................ | 385/15 |
| 5,524,144 A * | 6/1996 | Suzuki ....................... | 398/181 |
| 5,535,037 A * | 7/1996 | Yoneyama .................. | 398/181 |
| 5,608,562 A * | 3/1997 | Delavaux et al. ............ | 398/148 |
| 5,642,217 A * | 6/1997 | Carbone et al. ............. | 398/37 |
| 5,649,062 A * | 7/1997 | Teng et al. .................. | 706/23 |
| 5,673,132 A * | 9/1997 | Carbone et al. ............. | 398/37 |
| 5,717,510 A * | 2/1998 | Ishikawa et al. ............ | 398/199 |
| 6,115,157 A * | 9/2000 | Barnard et al. ................. | 398/1 |
| 6,151,148 A * | 11/2000 | Harano ........................ | 398/30 |
| 6,219,162 B1 * | 4/2001 | Barnard et al. ................ | 398/9 |
| 6,344,910 B1 * | 2/2002 | Cao ............................ | 398/34 |
| 6,445,471 B1 * | 9/2002 | Shimokawa et al. .......... | 398/79 |
| 6,480,329 B2 * | 11/2002 | Sugaya et al. .......... | 359/341.42 |
| 6,570,691 B1 * | 5/2003 | Miyauchi et al. ............ | 398/158 |
| 6,738,584 B1 * | 5/2004 | Tsuda et al. ................. | 398/147 |
| 6,742,154 B1 * | 5/2004 | Barnard ...................... | 714/752 |
| 6,792,214 B1 * | 9/2004 | Essiambre et al. .......... | 398/147 |
| 6,804,469 B2 * | 10/2004 | Kasahara et al. ............ | 398/177 |
| 6,807,370 B2 * | 10/2004 | Harasawa .................... | 398/13 |
| 6,819,479 B1 * | 11/2004 | Islam et al. ................. | 359/337 |

(Continued)

FOREIGN PATENT DOCUMENTS

EP    0 700 178 A    3/1996

(Continued)

Primary Examiner—Ken N Vanderpuye
Assistant Examiner—Danny W Leung
(74) Attorney, Agent, or Firm—Patterson & Sheridan, L.L.P.

(57) ABSTRACT

A method of dynamically adjusting an optical module in an optical system including a plurality of transmission channels includes the following steps: measuring the quality of the optical signal at the output of the system as defined by an error function, varying an optical parameter of at least one module of the system, measuring a differential error introduced by each variation on the error function of the optical signal at the output of the system, estimating an operating point of the system corresponding to an expected reduction of the error function, and adjusting a parameter of an optical module toward the operating point of the system.

21 Claims, 1 Drawing Sheet

U.S. PATENT DOCUMENTS

| | | | |
|---|---|---|---|
| 6,859,307 B2* | 2/2005 | Takeda et al. | 359/337 |
| 6,922,532 B2* | 7/2005 | Simard et al. | 398/177 |
| 6,937,820 B2* | 8/2005 | Iwaki et al. | 398/6 |
| 6,973,622 B1* | 12/2005 | Rappaport et al. | 715/735 |
| 7,106,969 B1* | 9/2006 | Lichtman et al. | 398/59 |
| 7,248,804 B2* | 7/2007 | Maeda et al. | 398/180 |
| 7,389,049 B2* | 6/2008 | Takahara et al. | 398/81 |
| 2001/0019436 A1* | 9/2001 | Nakajima et al. | 359/110 |
| 2002/0044317 A1* | 4/2002 | Gentner et al. | 359/124 |
| 2002/0114062 A1* | 8/2002 | Simard et al. | 359/337 |
| 2002/0178417 A1* | 11/2002 | Jacob et al. | 714/752 |
| 2002/0186916 A1* | 12/2002 | Bessios | 385/14 |
| 2003/0016695 A1* | 1/2003 | Sabet et al. | 370/465 |

FOREIGN PATENT DOCUMENTS

WO      WO 01/65733 A1      9/2001

* cited by examiner

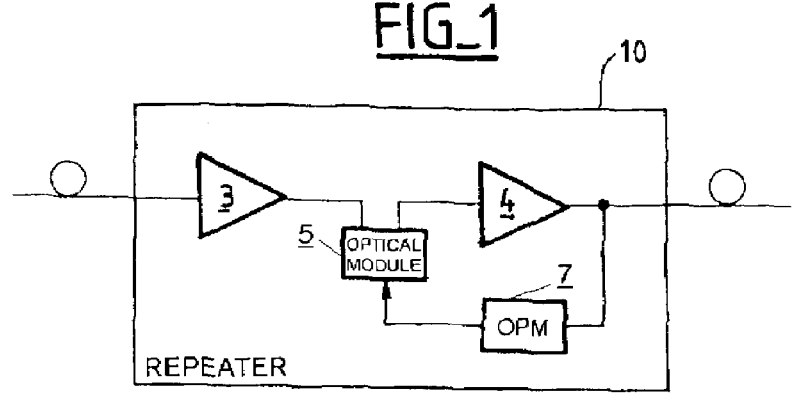
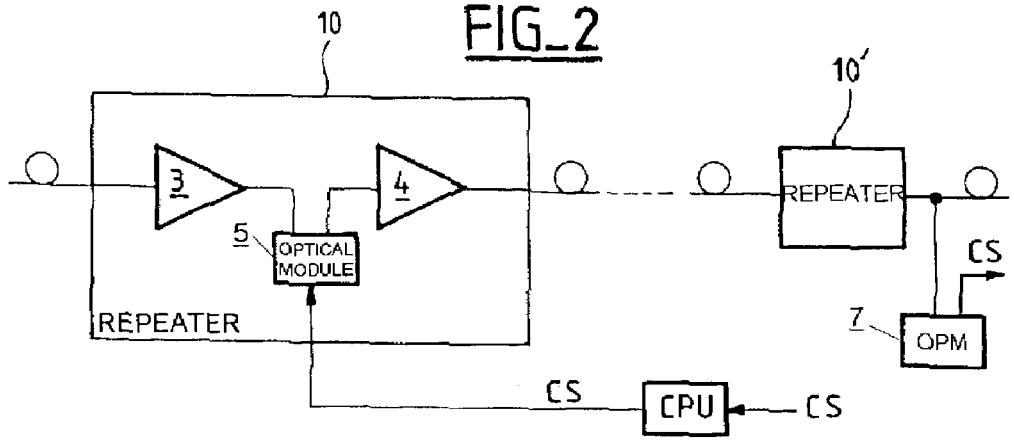
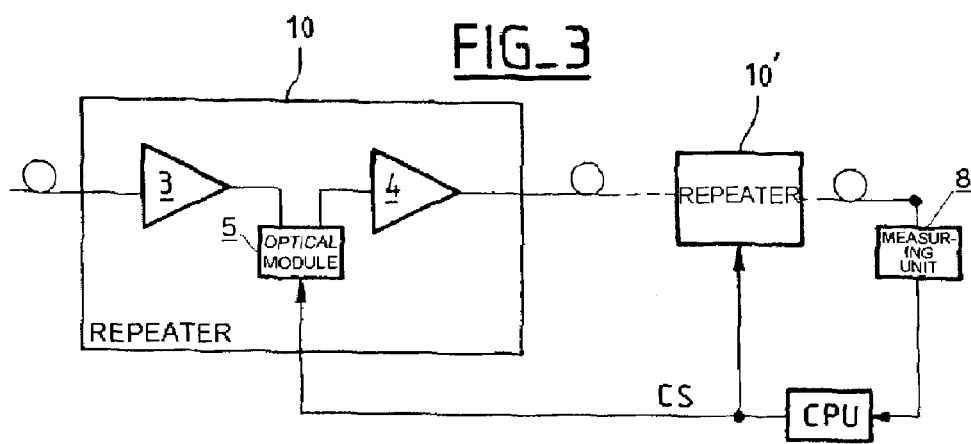

METHOD OF DYNAMICALLY CONTROLLING AN OPTICAL MODULE

BACKGROUND OF THE INVENTION

1. Field of the Invention

The field of the present invention is that of optical systems used in the transmission and/or amplification of optical signals.

2. Description of the Prior Art

Systems of the above kind conventionally include a few hundred or a few thousand kilometers of transmission optical fibers, depending on the application, divided into sections connected by repeaters in which the optical signals transmitted are amplified and sometimes reshaped. Optical signals are transmitted in fibers simultaneously on a plurality of optical channels. The signals are therefore not all subjected to the same optical treatment and stresses. The optical repeaters therefore include different optical modules for processing some or all of the transmitted signals. For example, a repeater can include amplifiers (fiber amplifiers or semiconductor amplifiers), chromatic dispersion compensators, gain equalizers, multiplexers and any other module that the person skilled in the art may deem to be required.

Transmission optical fibers generally have a monomode or multimode core for the simultaneous propagation of a plurality of optical signals surrounded by a cladding protected by a polymer coating. The core and/or the cladding can be of silica or of a polymer plastics material, depending on the application. The fibers have a signal attenuation and a pass-band suited to the applications in which they are used.

An optical repeater generally includes two stages of optical amplifiers, and often a gain equalizer, multiplexer, dispersion compensator or other optical module between the two stages. These modules introduce losses, which can generally reach 9 dB, and their parameters are generally set by a specification during design and installation of the transmission line.

Optical systems are often subject to change and it is not uncommon for the parameters of an optical module no longer to be suitable for current transmission spectra. For example, the various optical components constituting the modules are subject to aging, localized work may be carried out on the line, or optical transmission channels or modules may be added after the line is installed. The parameters of the modules previously set then become unsuitable.

Moreover, fiber amplifiers (erbium-doped fiber or Raman amplifiers) are associated with pump lasers whose performance is fixed once they are installed. Just like pump lasers, amplifiers are often standardized and are not necessarily well matched to the operating conditions under which they are used, and even more so to changes therein.

Moreover, optical amplifiers are often associated with gain equalizers for compensating amplification differences between the transmitted signal channels. The equalizers are designed to conform to operating conditions of the amplifier that depend among other things on the input power. The input power may vary along the transmission line, for example as a function of the length of fiber through which the signal has traveled. A variation of power at the input of an amplifier shifts its operating point and causes a mismatch of the associated equalizer filter. For this reason dynamic optical equalizers have been developed; they adapt to the operating conditions of the amplifiers at all points of the transmission line. Gain equalizers provide a dynamically adjustable attenuation as a function of wavelength.

It is therefore standard practice to provide adjustable modules in optical repeaters, in particular dynamic optical equalizer modules, to adjust the operating conditions of the optical modules along the transmission line. Similarly, using tunable pump lasers to modify the characteristics of the amplifiers of an optical system is also known in the art.

Adjustable modules of the above kind (and lasers) exist already and are well known to the person skilled in the art. The essential problem is that of controlling the adjustable modules to modify their parameters in order to select optimum operating conditions. Tunability may be provided at the level of the module or at the level of the optical component.

Existing control techniques necessitate the measurement of certain optical or performance parameters and applying appropriate control signals as a function of the measured parameters.

FIG. 1 relates to a first prior art control technique and shows diagrammatically a repeater 10 with two amplifier stages 3 and 4 and an optical module 5, for example a gain equalizer. An optical measurement is carried out, for example by means of an optical spectrum analyzer 7 such as an OPM (optical power monitor) or an OCM (optical channel monitor). The transmission spectrum can be measured optically before, after or between the amplifier stages 3 and 4. The measurement is fed back to a control unit, such as a local processor, which operates on the module 5 or directly on the optical component to adjust it as a function of fixed parameters, such as a gain template in the case of a gain equalizer module. This prior art technique necessitates measuring means 7 (for example a spectrum analyzer) for each repeater 10, which represents a non-negligible cost, and does not necessarily produce the optimum adjustment because it does not reflect all of the optical changes to the line, the template set for a given component not necessarily being the optimum at a given time. This control technique takes no account of the possibility of disturbances farther down the line.

FIG. 2 relates to another prior art control technique, and shows the same components identified by the same reference numbers. This prior art technique measures optical parameters at a given point of the line for action upstream thereof. For example, the adjustment of a given optical module 5 located in a given optical repeater 10 is controlled by a measurement effected by a spectrum analyzer 7 in a downstream repeater 10' which is around ten repeaters farther along, for example. The adjustment control signal is then transmitted by supervisory channels CS in the transmission line which are reserved for control and command purposes and can be used for the above measurements and adjustments.

The above kind of technique reflects the actual transmission line constraints better, but is relatively greedy in terms of capacity. The supervisory channels are limited so as not to encroach on the wanted bandwidth and are essentially reserved for purposes other than optical module adjustment.

Moreover, the above control techniques are still based on the replication of optical parameters, such as a power spectral template or an optical signal to noise ratio (OSNR) template, which have a direct influence on the quality of the signal but which are defined on the basis of hypotheses that cannot generally be guaranteed throughout the life of a system, or even when it is installed.

The document EP0700178 discloses a method of adjusting a wavelength tunable source and filters in an optical system having a single transmission channel, the method including:

a step of measuring the quality of the optical signal at the output of the system as defined by an error function based on the eye diagram or the bit error rate (BER),
   a step of sweeping the wavelength to adjust it for an expected reduction of the error function, and a step of adjusting transmission characteristics of the filter as a function of the chosen wavelength.

To be more precise, the evolution of the error function as a function of wavelength is completely characterized throughout the range of values thereof.

This method is not compatible with optimizing the performance of the system in operation, i.e. while the system is transmitting data, as it necessarily implies momentarily degraded performance.

The method disclosed in the above prior art document is not a reliable and powerful method of adjusting a dynamic module.

Moreover, the above method relates to the adjustment of parameters associated with only a single transmission channel, rather than relating more widely to selective adjustment of parameters of one channel as a function of other channels.

Moreover, all the control techniques previously described are unable to adjust a plurality of parameters of a plurality of remote optical modules as a function of each other to optimize the operation of the optical system as a whole, in particular if there is a large number of parameters and/or a large number of transmission channels and/or of modules.

Accordingly, the above technique cannot efficiently manage dynamic modules distributed along a transmission line. Transmission system performance could therefore be significantly improved by efficient dynamic control of optical modules distributed along a transmission line.

The object of the present invention is to propose a new technique for dynamically controlling one or more optical modules included in an optical system including a plurality of transmission channels on the basis of the optical signal at the output of the system for adjustment of optical parameters of one or more upstream adjustable modules, which adjustment is optimized in terms of efficiency (response time, output signal quality improvement, reliability, etc.).

In particular, the invention aims to adjust optical parameters of the modules distributed within a system, such as a transmission line, as a function of each other and on the basis of the optical signal at the output of the system.

SUMMARY OF THE INVENTION

To this end the present invention proposes a method of dynamically adjusting an optical module in an optical system including a plurality of transmission channels, which method includes the following steps:

measuring the quality of the optical signal at the output of the system as defined by an error function;

varying an optical parameter of at least one module of the system;

measuring a differential error introduced by each variation on the error function of the optical signal at the output of the system;

estimating an operating point of the system corresponding to an expected reduction of the error function; and adjusting a parameter of an optical module toward the operating point of the system.

Each parameter variation is advantageously effected in the vicinity of the value of the parameter associated with a current operating point and is preferably an infinitesimal variation.

According to one feature of the invention, two or more parameters of an optical module of the system are successively affected by a variation.

According to one feature of the invention, all parameters of each optical module of the system are successively affected by a variation.

According to one feature of the invention, the steps of the method are repeated in looped fashion during operation of the optical system.

In the various embodiments of the invention the quality of the optical signal for each transmission channel at the output of the system is measured by a forward error correction module on the basis of a bit error rate or by means of an eye diagram.

The error function used to define the quality of the optical signal at the system output is defined as the sum of the bit error rates squared $E=(\Sigma_i BER_i^2)$ for all the transmission channels of the system or is of the type $E=[\alpha\Sigma(ei)^\beta]^\gamma$ where ei is the quality of the $i^{th}$ transmission channel of the system and $\alpha$, $\beta$ and $\gamma$ are positive constants and are not necessarily integers.

In an advantageous embodiment of the invention the operating point is calculated by a central control unit of the system and the variations of the parameters of the optical modules and the commands for adjusting each optical module of the system are determined by a central control unit of the system and transmitted over supervisory channels of the system.

In an advantageous embodiment of the invention the optical modules to be adjusted are modeled and a function is defined for direct conversion between a command sent by the supervisory system and the variation induced in an optical parameter of the module and the conversion is preferably effected by the module itself so as to produce a given parameter variation in response to a given received command.

The present invention also provides an optical system including a plurality of transmission channels and adjustable optical modules and means for implementing a method of dynamically adjusting an optical module in an optical system including a plurality of transmission channels, which method includes the following steps:

measuring the quality of the optical signal at the output of the system as defined by an error function;

varying an optical parameter of at least one module of the system;

measuring a differential error introduced by each variation on the error function of the optical signal at the output of the system;

estimating an operating point of the system corresponding to an expected reduction of the error function; and adjusting a parameter of an optical module toward the operating point of the system.

According to one feature of the invention, the optical system further includes means for varying optical parameters of each module associated with means for measuring differential errors introduced by the variations on an error function representing the quality of the optical signal at the output of the system and means for calculating an operating point of the system corresponding to a reduction of the error function.

Depending on the intended application of the invention, the adjustable optical modules are optical gain equalizers and/or pump lasers and/or multiplexers and/or couplers and/or chromatic dispersion compensators and/or polarization mode dispersion compensators and/or filters and/or variable attenuators and/or variable slope attenuators and/or selectors (add and drop multiplexers (OADM) or cross connect selectors (OXC)).

The features and advantages of the present invention will become more clearly apparent after reading the following description, which is given by way of illustrative and nonlimiting example and with reference to the accompanying drawings.

BRIEF DESCRIPTION OF THE DRAWINGS

FIG. 1, already described, shows diagrammatically a first prior art control technique.

FIG. 2, already described, shows diagrammatically a second prior art control technique.

FIG. 3 shows diagrammatically an optical module control technique according to the invention.

DETAILED DESCRIPTION OF THE PREFERRED EMBODIMENT

Referring to FIG. 3, the technique of controlling adjustable optical modules of an optical system including a plurality of transmission channels is based on measuring the quality of the optical signal at the output of the system for a plurality of channels. Accordingly, a global analysis can be carried out and the adjustment of the parameters of each module can take account of general system constraints. This kind of global analysis implies taking account of all elements of the transmission line, from end to end, and means that all sources of deterioration are taken into consideration.

The system concerned can be a transmission line including sections of transmission fiber connected by optical repeaters 10. However, the method according to the invention applies equally to other optical systems, such as branched or meshed transparent optical networks including nodes including in particular optical selectors, couplers or multiplexers, for example.

According to the invention, the optical quality of the signal received at the output is measured by a measuring unit 8 such as an electronic signal processor unit. Depending on the embodiment, the quality measurement can be derived from an eye diagram representing the quality of the optical transitions between 0 bits and 1 bits of the received optical signals or the bit error rate (BER). Some optical systems process the BER to provide error correction feedback, known as forward error correction (FEC). A forward error correction module FEC is provided in the receiver of the optical system. The FEC module detects errors with a high success rate (typically one error in 100 000 is not detected).

To this end, some transmission channels and/or some time slots of each channel are dedicated to control bits such as parity bits, for example. The bit error rate BER prior to correction by the FEC module is a parameter that is directly accessible in conventional optical systems, with an uncertainty in respect of the BER as estimated by the FEC module that is very low, typically of the order of $10^{-5}$.

Starting from a given operating point of the optical system referred to as the current operating point X, an adjustable module $X_1$ of an optical module of the system is disturbed successively by a variation $\Delta X_1$ in the vicinity of the value of said parameter associated with the current operating point, preferably an infinitesimal variation, whereas all the other parameters of the system are maintained at their value $X_k$ (k≠1) corresponding to the current operating point X. Similarly, one or more other adjustable parameters $X_1$ of an optical module of the system are successively disturbed with a similar variation $\Delta X_1$ whereas all the other parameters of the system are maintained at their value $X_k$ (k≠1) corresponding to the current operating point X.

This can advantageously apply to all parameters of all modules.

The variations are advantageously transmitted to the modules via the supervisory channels and commanded by a central supervisory unit CPU of the system that is also able to interpret the measurements of the quality of the signal at the output of the system. A scalar error function is calculated from these basic measurements on each transmission channel i.

A differential error $\Delta E(1)=(\delta E/\delta X_1)_X \Delta X_1$ in the quality of the signal E at the output introduced by each variation is then measured, the differential error being negative (representing an improvement in operating conditions) or positive (representing a deterioration of operating conditions). For example, an error function defined as the sum of the BER squared $E=(\Sigma_i BER_i^2)$, accentuating the weights of the most effective channels, is considered to constitute a good estimate of the error at a given time.

In one particular embodiment, the error function used can be of the type $E=[\alpha\Sigma(ei)^\beta]^\gamma$, where ei is the quality of the $i^{th}$ transmission channel of the system, determined by the FEC module or from the eye diagram, and where α, β and γ are positive constants and not necessarily integers. It is preferable if β>1, 1.5<β<3, and γ=1/β.

The central control unit CPU of the system then calculates a new operating point of the system from each differential error introduced by each parameter variation. Note that a plurality of optical parameters $X_1$ can be relevant to variations for the same transmission channel i. Accordingly, a new operating point of the system can be determined that corresponds to an estimated reduction of the error function, the objective being to minimize the error function or at least to ensure that the function remains in the immediate vicinity of a minimum.

Accordingly, the new operating point calculated generally corresponds to a movement of the operating point in the direction of the gradient vector of the error function ($\Delta E/\Delta X$). The movement increment is determined by the optimization algorithm (i.e. the minimization of the error function) as a function of the amplitude of the gradient vector. The increment is generally reduced progressively to obtain effective minimization. However, the movement may be too great and lead to an increase in the error function, which will be corrected on the next movement. Suitable optimization algorithms, possibly with management of operating point movement, are well known to the person skilled in the art, and are described, for example, in "Numerical Recipes in C", 3rd edition.

Each module 3, 4, 5 can then be tuned as a function of the parameters corresponding to the new optimum operating point X of the system. A given module may not be adjusted under its own optimum operating conditions, but is tuned for optimum operating conditions for the system as a whole to which it belongs.

Like the variations, the adjustments of optical parameters of each module are commanded by the central unit CPU and transmitted via the supervisory channels CS or by any other appropriate means. The supervisory channels of the system according to the invention are busied only for controlling the optical modules and not for forwarding information to the central unit from each module, which limits the required capacity, in terms of supervisory channel bandwidth, for implementing the control method according to the invention, and reduces the response time.

In an advantageous embodiment, a parameter variation (as defined above) is requested for a particular duration, so that it is not necessary to send commands to return that parameter to the value corresponding to the reference point. Also, it is not necessary to wait for the measurement of the quality of the signal corresponding to a given variation before commanding variation of the next parameter. A plurality of successive variations can be requested by means of a single command, especially if the variations concern different parameters of the same optical module.

A control method according to the invention does not require an accurate knowledge of the correspondence between control parameters (voltage, current, etc.) and the optical parameters for each module of a system. This leads to a reduction in production testing costs and widens the parameter tolerances, in particular with regard to aging, during optical module fabrication. It is also possible to use the method according to the invention to make good any unexpected drift of an optical system. The optical system measures directly the variation of the signal quality as a function of the applied command, and it is therefore not necessary to know the correspondence between the command and the optical function variation of each module. Approximate modeling of the optical module can nevertheless be beneficial for optimizing the search for the optimum operating point thanks to a reduced choice of parameters for the command. For example, a function can be defined for direct conversion between the command sent by the supervisory system and the induced variation of an optical parameter of a modeled module. The conversion can advantageously be effected by the module itself in order to limit the necessary calculations by the CPU and most importantly to avoid having to update an exhaustive list in the CPU of the optical modules and the associated mathematical models. Thus the CPU processes all the parameters indifferently.

A control method according to the invention can further extend the adjustment of parameters to optical modules other than equalizers, variable slope attenuators and variable attenuators, for example to amplifier pumps.

Moreover, the optical modules subject to dynamic control can be distributed all along the transmission system without impacting on control quality. In particular, this allows the use of a simplified dynamic equalizer which can be integrated into the optical amplifier or its pumping module in each repeater, instead of using a complex equalizer every five to ten repeaters.

This kind of technique for controlling the optical parameters of a system has an improved response time compared to the prior art techniques. Considering, for example, an optical system comprising an undersea optical link transmitting 160 channels at 10 Gbit/s over approximately 7 000 km with 200 optical repeaters, Raman distributed amplifiers with four pumps per repeater, and an equalizer with 40 adjustable parameters every ten repeaters, that amounts to 800 pumps and 400 equalization parameters, i.e. 1 200 parameters in total. Considering an acceptable maximum BER of $10^{-5}$, assessing the impact of each disturbance takes approximately 10 ms with a 0.1% accuracy for the BER of each channel. An additional 10 ms can advantageously be provided for stabilization of the system before the error introduced is estimated. Accordingly, with 20 ms for estimating the differential error for each parameter varied, 24 s are required to determine a new operating point of the system, which is perfectly acceptable for an undersea link, in which the time constants of optical parameter fluctuations generally correspond to hours or even days.

Similarly, considering, for example, an optical system comprising a terrestrial optical link transmitting 160 channels at 10 Gbit/s over approximately 2 000 km with 20 optical repeaters, amplifiers with 16 pumps per repeater, and an equalizer with 40 adjustable parameters every ten repeaters, that makes 320 pumps and 80 equalization parameters, i.e. 400 parameters in total. Taking again 20 ms as the time to estimate the differential error for each parameter varied, it takes 8 s to determine a new operating point of the system, which is perfectly acceptable for a terrestrial link.

In an emergency, if a sudden deterioration of signal quality is detected on one or more transmission channels, a fast estimate can be effected with a reduced number of parameters affecting the damaged channels directly and selectively. The central supervisory unit of the system can quickly determine the parameters to be tested and adjusted.

Similarly, in the event of intentional modification of the operation of the system, such as reconfiguration of an OADM or an OXC, the central unit can react quickly and selectively adjust the parameters directly affected, for example the power of the new channels added or adjacent channels.

The invention claimed is:

1. A method of dynamically adjusting an optical system having a plurality of transmission channels, a first repeater and a second repeater, each repeater having at least one optical module, the method comprising:

measuring the quality of an optical signal at an output of the system downstream of the second repeater using an electronic signal processor unit and sending a signal to a central control unit of the system, wherein the quality is defined by an error function (E);

varying at least one optical parameter of the at least one optical module in the first repeater and at least one optical parameter of the at least one optical module in the second repeater using the central control unit;

measuring a differential error ($\Delta E$) introduced by each variation on the error function of the optical signal at the output of the system;

estimating an operating point (X) of the system corresponding to an expected reduction of the error function (E) using the central control unit; and adjusting at least one parameter of the at least one optical module in the first repeater and the at least one optical module in the second repeater toward said operating point of the system (X) based upon commands transmitted via supervisory channels by the central control unit.

2. The method according to claim 1 of dynamically adjusting an optical module, characterized in that each parameter variation is effected in the vicinity of the value of said parameter associated with the current operating point and is preferably an infinitesimal variation.

3. The method according to claim 1 of dynamically adjusting an optical module, characterized in that at least two parameters of at least one optical module of the system are successively affected by a variation.

4. The method according to claim 1 of dynamically adjusting an optical module, characterized in that all parameters ($X_1$) of each optical module of the system are successively affected by a variation.

5. The method according to claim 1 of dynamically adjusting an optical module, characterized in that the steps of said method are repeated in looped fashion during operation of the optical system.

6. The method according to claim 1 of dynamically adjusting an optical module, characterized in that the quality of the optical signal for each transmission channel ($e_i$) at the output of the system is measured by the forward error correction module (FEC) on the basis of a bit error rate (BER).

7. The method according to claim 1 of dynamically adjusting an optical module, characterized in that the quality of the optical signal for each transmission channel ($e_i$) at the output of the system is measured by means of an eye diagram.

8. The method according to claim 1 of dynamically adjusting an optical module, characterized in that the operating point (X) is calculated by the central control unit of the system.

9. The method according to claim 1 of dynamically adjusting an optical module, characterized in that the variations of the parameters of the optical modules are transmitted over supervisory channels of said system.

10. A method of dynamically adjusting an optical system having a plurality of transmission channels, a first repeater and a second repeater, each repeater having at least one optical module, the method comprising:

measuring the quality of an optical signal at an output of the system downstream of the second repeater using a measuring element and sending a signal to a central control unit of the system, wherein the quality is defined by an error function (E), wherein $E=[\alpha\Sigma(ei)^\beta]^\gamma$ where ei is the quality of the $i^{th}$ transmission channel of the system and $\alpha$, $\beta$ and $\gamma$ are positive constants and are not necessarily integers;

varying at least one optical parameter of the at least one optical module in the first repeater and at least one optical parameter of the at least optical module in the second repeater using the central control unit;

measuring a differential error ($\Delta E$) introduced by each variation on the error function of the optical signal at the output of the system;

estimating an operating point (X) of the system corresponding to an expected reduction of the error function (E);

adjusting at least one parameter of the at least one optical module in the first repeater and the at least one optical module in the second repeater toward said operating point of the system (X) based upon commands transmitted via supervisory channels by the central control unit, and measuring the quality of the optical signal at the output of the system and sending a second signal to the central control unit.

11. The method according to claim 10 of dynamically adjusting an optical module, characterized in that each parameter variation is effected in the vicinity of the value of said parameter associated with the current operating point and is preferably an infinitesimal variation.

12. The method according to claim 10 of dynamically adjusting an optical module, characterized in that at least two parameters of at least one optical module of the system are successively affected by a variation.

13. The method according to claim 10 of dynamically adjusting an optical module, characterized in that all parameters ($X_1$) of each optical module of the system are successively affected by a variation.

14. The method according to claim 10 of dynamically adjusting an optical module, characterized in that the steps of said method are repeated in looped fashion during operation of the optical system.

15. The method according to claim 10 of dynamically adjusting an optical module, characterized in that the quality of the optical signal for each transmission channel ($e_i$) at the output of the system is measured by the forward error correction module (FEC) on the basis of a bit error rate (BER).

16. The method according to claim 10 of dynamically adjusting an optical module, characterized in that the quality of the optical signal for each transmission channel ($e_i$) at the output of the system is measured by means of an eye diagram.

17. The method according to claim 1, wherein $E=[\alpha\Sigma(ei)^\beta]^\gamma$ where ei is the quality of the $i^{th}$ transmission channel of the system and $\alpha$, $\beta$ and $\gamma$ are positive constants.

18. The method according to claim 1, wherein a plurality of parameters is adjusted in the at least one optical module in each repeater.

19. The method according to claim 18, wherein the plurality of parameters is adjusted as function of the at least one optical module in each repeater.

20. The method according to claim 1, wherein the optical modules to be adjusted are modeled and a function is defined for direct conversion between a command sent by a supervisory system and the variation induced in an optical parameter of said module.

21. The method according to claim 20, wherein the conversion is effected by the module so as to produce a given parameter variation in response to a given received command.

* * * * *